United States Patent
Gao

(10) Patent No.: US 8,369,511 B2
(45) Date of Patent: Feb. 5, 2013

(54) ROBUST METHOD OF ECHO SUPPRESSOR

(75) Inventor: Yang Gao, Mission Viejo, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 1333 days.

(21) Appl. No.: 11/942,093

(22) Filed: Nov. 19, 2007

(65) Prior Publication Data

US 2008/0152156 A1 Jun. 26, 2008

Related U.S. Application Data

(60) Provisional application No. 60/877,174, filed on Dec. 26, 2006.

(51) Int. Cl.
*H04B 3/23* (2006.01)
(52) U.S. Cl. ............... 379/406.05; 381/93; 381/94.1; 381/94.3; 370/286; 455/570
(58) Field of Classification Search ............ 381/66, 381/93, 94.1, 94.3; 379/406.01–406.16; 370/282–286; 455/570
See application file for complete search history.

(56) References Cited

U.S. PATENT DOCUMENTS

| | | | | |
|---|---|---|---|---|
| 4,621,172 A * | 11/1986 | Kanemasa et al. | ............ | 370/291 |
| 5,274,705 A * | 12/1993 | Younce et al. | ............ | 379/406.05 |
| 5,414,766 A * | 5/1995 | Cannalire et al. | ............ | 379/406.08 |
| 5,563,944 A * | 10/1996 | Hasegawa | ............ | 379/406.04 |
| 5,732,134 A * | 3/1998 | Sih | ............ | 379/406.13 |
| 6,163,608 A * | 12/2000 | Romesburg et al. | ............ | 379/406.01 |
| 6,404,886 B1 * | 6/2002 | Yoshida et al. | ............ | 379/406.01 |
| 6,597,787 B1 * | 7/2003 | Lindgren et al. | ............ | 379/406.05 |
| 6,738,358 B2 * | 5/2004 | Bist et al. | ............ | 370/289 |
| 6,816,592 B1 * | 11/2004 | Kirla | ............ | 379/406.05 |
| 7,167,568 B2 * | 1/2007 | Malvar et al. | ............ | 381/66 |
| 7,813,497 B2 * | 10/2010 | Brox | ............ | 379/406.08 |
| 7,856,097 B2 * | 12/2010 | Tokuda | ............ | 379/406.05 |
| 7,945,442 B2 * | 5/2011 | Zhang et al. | ............ | 704/226 |
| 2003/0072439 A1 * | 4/2003 | Gupta | ............ | 379/406.05 |
| 2003/0076947 A1 * | 4/2003 | Furuta et al. | ............ | 379/406.01 |
| 2003/0235295 A1 * | 12/2003 | He et al. | ............ | 379/406.01 |
| 2004/0114542 A1 * | 6/2004 | Stopler | ............ | 370/286 |
| 2005/0129226 A1 * | 6/2005 | Piket et al. | ............ | 379/406.01 |
| 2005/0286714 A1 * | 12/2005 | Tokuda | ............ | 379/406.05 |
| 2006/0018460 A1 * | 1/2006 | McCree | ............ | 379/406.08 |
| 2007/0041575 A1 * | 2/2007 | Alves et al. | ............ | 379/406.08 |
| 2007/0165838 A1 * | 7/2007 | Li et al. | ............ | 379/406.01 |
| 2007/0280472 A1 * | 12/2007 | Stokes III et al. | ............ | 379/406.01 |
| 2008/0101622 A1 * | 5/2008 | Sugiyama | ............ | 381/66 |
| 2008/0152167 A1 * | 6/2008 | Taenzer | ............ | 381/94.2 |
| 2008/0304654 A1 * | 12/2008 | Alves et al. | ............ | 379/406.12 |
| 2008/0304676 A1 * | 12/2008 | Alves et al. | ............ | 381/66 |
| 2008/0310643 A1 * | 12/2008 | Alves et al. | ............ | 381/66 |
| 2008/0310644 A1 * | 12/2008 | Alves et al. | ............ | 381/66 |
| 2009/0041263 A1 * | 2/2009 | Hoshuyama | ............ | 381/94.1 |
| 2009/0268920 A1 * | 10/2009 | Fan | ............ | 381/66 |
| 2010/0166199 A1 * | 7/2010 | Seydoux | ............ | 381/66 |

* cited by examiner

*Primary Examiner* — Matthew Landau
*Assistant Examiner* — Maliheh Malek
(74) *Attorney, Agent, or Firm* — Huawei Technologies Co., Ltd.

(57) ABSTRACT

This invention proposed an Echo Suppressor which can efficiently suppress both echoes and background noise without introducing "choppiness". The Echo Suppressor System includes said two adaptive gains $G_r(RSR)$ and $G_n(NSR)$, said one adaptive zeros-filter $A_1(z)$ and said one adaptive poles-filter $A_2(z)$; wherein, thr gain $G_r(RSR)$ is controlled by RSR (Residual echo level to Signal level Ratio); the gain $G_n(NSR)$ is controlled by NSR (Noise signal level to current Signal (Tx) level Ratio); the filter $A_1(z)$ is converted from $LSF_1$ obtained from the first modification of $LSF_{Tx}$ (Line Spectral Frequencies of Tx signal); the filter $A_2(z)$ is converted from $LSF_2$ obtained from the second modification of $LSF_{Tx}$.

18 Claims, 4 Drawing Sheets

An Example of Line Echo Canceling System

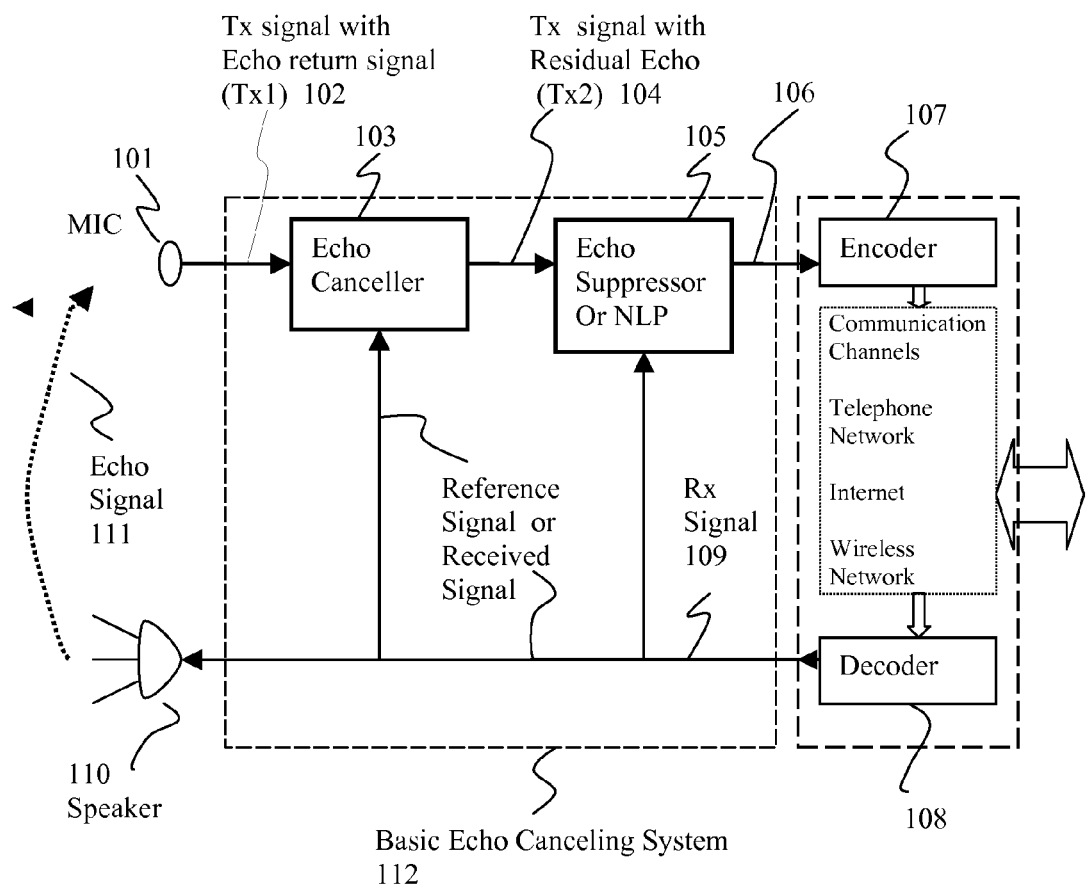
FIG. 1  An Example of Acoustic Echo Canceling System

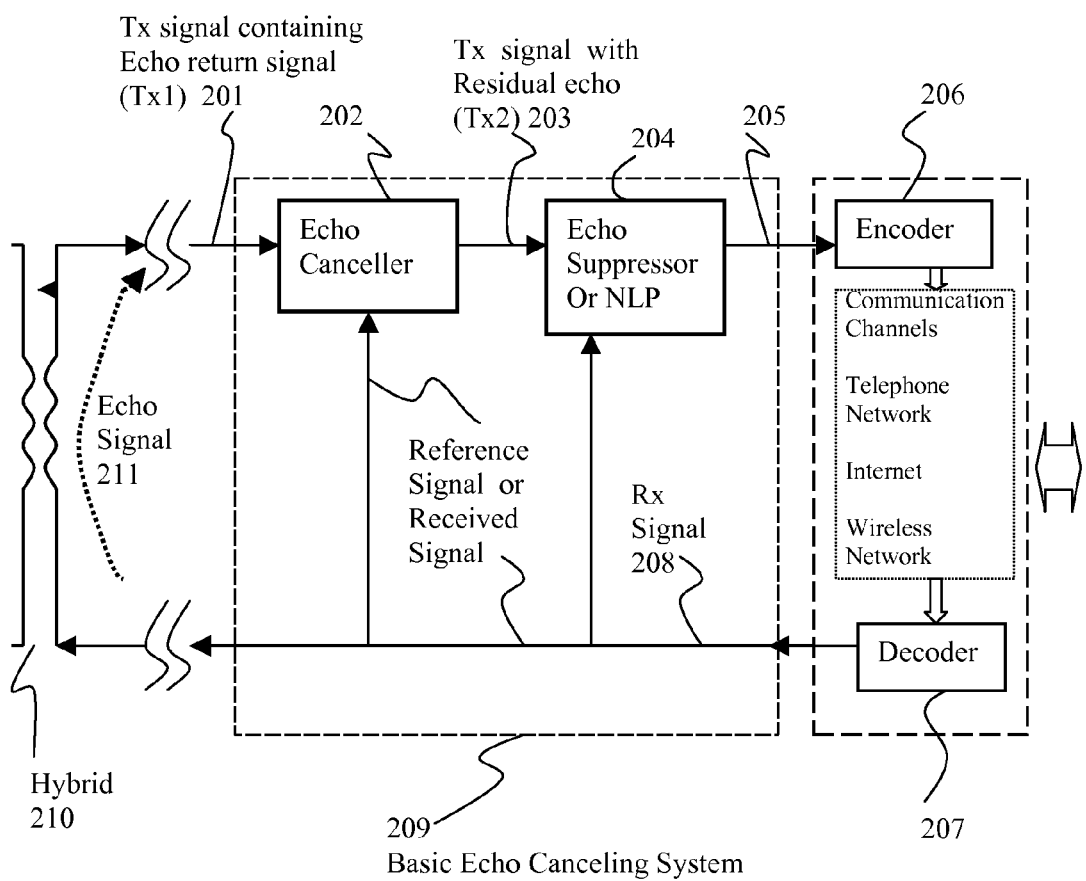
FIG. 2  An Example of Line Echo Canceling System

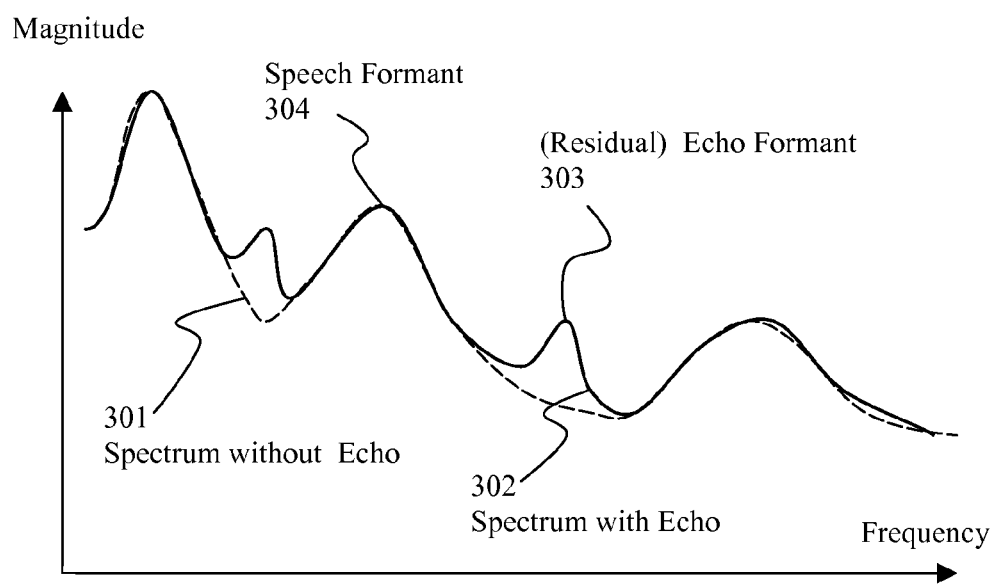
FIG. 3 Spectrum Envelope of Tx Signal in Double Talk Case

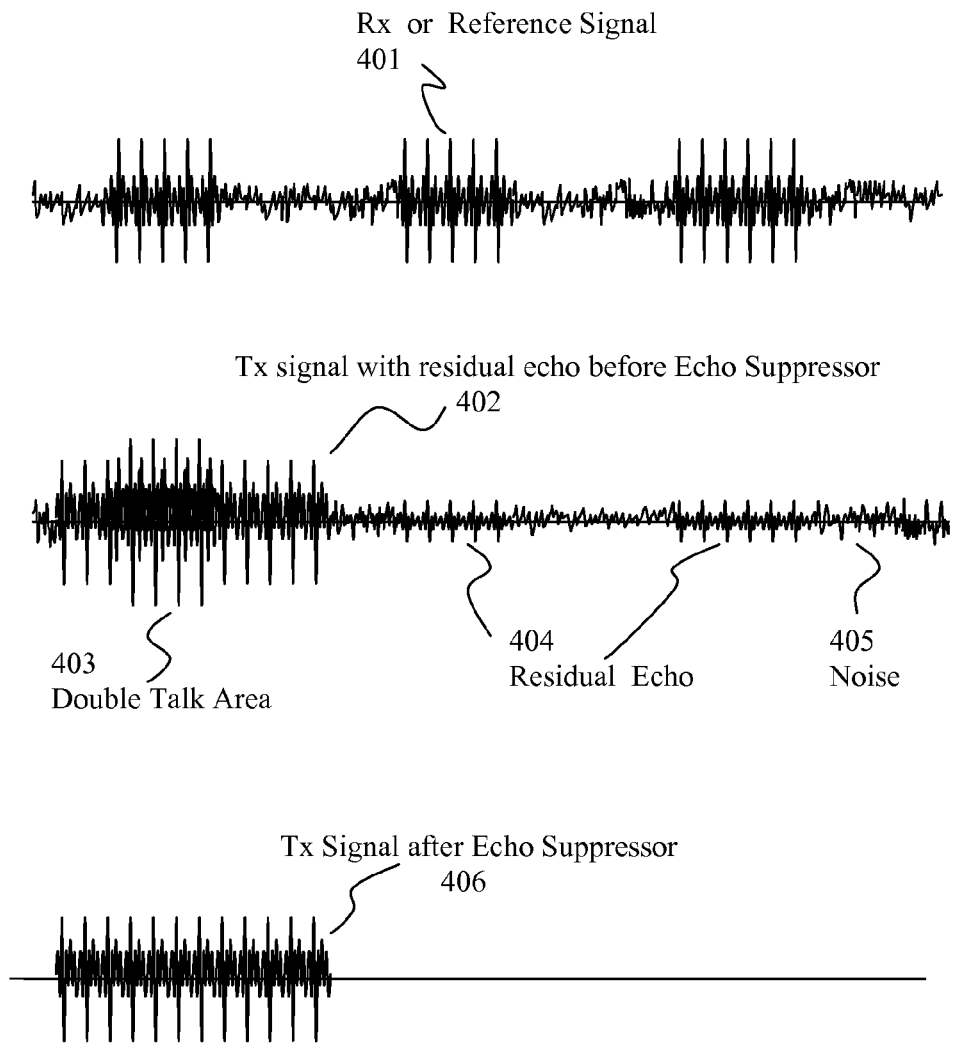
FIG. 4 Signals with or without Echo Suppressor

US 8,369,511 B2

ROBUST METHOD OF ECHO SUPPRESSOR

BACKGROUND OF THE INVENTION

1. Field of the Invention

The invention relates to telecommunication equipment, and in particular, to a method for echo cancellation and suppression.

2. Background Art

Echo Cancellers

Echo Canceller (EC) is a device or software which could cancel echo signals by using some reference signal. The reference signal is also called received signal (Rx signal). The echo signal is also called echo return signal which is mixed in the transmission signal (Tx signal). There are two major types of echo cancellers: one is called Acoustic Echo Canceller (AEC); another one is named as Line Echo Canceller (LEC). Obviously, AEC is used to cancel acoustic echoes and LEC is employed to cancel line echoes.

Line echoes result from imperfect impedance matching by hybrids in two-to-four wire signal conversion. Acoustic echoes happen in the field of telecommunication equipment where acoustically coupled echoes are transmitted back to the receiving party while also providing a full duplex connection; it is also a problem in the filed of audio conferencing to prevent adding noise of the inactive talkers into the output while also providing a conference bridge where two or more conferees can talk at one. Some echo is acceptable in voice conversations, however, users are annoyed by listening to their own speech delayed by the round-trip time of the system.

Echo canceller often consists of an adaptive filter with Least Mean Square (LMS) algorithm which generates an echo replica signal similar to the echo signal. A subtraction between the echo return signal and the echo replica signal is conducted in order to cancel the echo return signal. Due to the fact that the replica signal could not be perfect enough to duplicate the echo return signal for various reasons, there is always some residual echo left in the transmission signal. Echo Suppression is an apparatus which could perform echo reduction and/or echo elimination, in particular for reducing or eliminating residual echo signals left after echo canceller. Due to the inherent problems associated with echo cancellers, many solutions rely significantly on an additional echo suppression stage.

Echo Suppression

Echo Suppressor is a device or software which could dramatically reduce the (residual) echo energy without significantly distorting the non-echo speech signal. Although Echo Suppressor can work alone without combining with echo canceller, it often works as a compensation of echo canceller. Not only Echo Suppressor can dramatically suppress the residual echo energy but also reduce background noise energy by taking the advantage of available parameters. Echo Suppressor could be viewed as an independent function or just a part of Echo Canceller system.

Existing Echo Suppression methods are mostly based on the following approaches:

Spectrum Echo Suppression is one of the popular approaches. This approach requires FFT operation to transform time domain signals into frequency domain; so, the complexity is not low. This approach needs to carefully tune all the parameters in order to avoid possible "music noise" before doing Inverse FFT of the modified spectrum back into time domain.

Another popular way is called NLP (Non-Linear Processor) which replaces the residual echo signal with random noise or turns off transmission in the reverse direction while one person is talking and double talk does not exist. This method is simple but requires very robust double talk detection and residual echo detection. Due to the fact that it is very difficult to have a precise double talk detector or perfect residual echo detection, this approach often introduces "choppiness", especially in noisy environments.

This invention proposed an Echo Suppression approach which can achieve robust performance with low complexity level.

SUMMARY OF THE INVENTION

In accordance with the purpose of the present invention as broadly described herein, there is provided model and system for Echo Suppressor.

The invention proposed an Echo Suppressor which can efficiently suppress both echoes and background noise without introducing "choppiness". The Echo Suppressor System includes said two adaptive gains $G_r(RSR)$ and $G_n(NSR)$, said one adaptive zeros-filter $A_1(z)$ and said one adaptive poles-filter $A_2(z)$; wherein, thr gain $G_r(RSR)$ is controlled by RSR (Residual echo level to Signal level Ratio); the gain $G_n(NSR)$ is controlled by NSR (Noise signal level to current Signal (Tx) level Ratio); the filter $A_1(z)$ is converted from $LSF_1$ obtained from first modification of $LSF_{Tx}$ (Line Spectral Frequencies of Tx signal); the filter $A_2(z)$ is converted from $LSF_2$ obtained from second modification of $LSF_{Tx}$.

BRIEF DESCRIPTION OF THE DRAWINGS

The features and advantages of the present invention will become more readily apparent to those ordinarily skilled in the art after reviewing the following detailed description and accompanying drawings, wherein:

FIG. 1 shows an example of AEC system 112.

FIG. 2 shows an example of LEC system 209.

FIG. 3 shows an example of a double talker's spectrum.

FIG. 4 explains an example case with 3 signals of Rx and Tx.

DETAILED DESCRIPTION OF THE INVENTION

The present invention discloses an Echo Suppressor system which can suppress residual echoes and background noise even at double talker case, without introducing "choppiness". The following description contains specific information pertaining to Echo Suppressor. However, one skilled in the art will recognize that the present invention may be practiced in conjunction with various algorithms different from those specifically discussed in the present application. Moreover, some of the specific details, which are within the knowledge of a person of ordinary skill in the art, are not discussed to avoid obscuring the present invention.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

FIG. 1 shows an example of AEC system 112. The echo signal 111 comes from speaker 110 and returns to micro phone 101. The signal which is sent to speaker 110 is called received signal 109 or reference signal to AEC 103 and Echo Suppressor 105. The signal which goes into AEC 103 and comes from MIC 101 is called the transmission signal 102 which includes the echo return signal (originally from speaker). This echo return signal needs to be cancelled or suppressed by AEC 103 and Echo Suppressor 105. AEC usually works by using the reference signal to generate some replica signal which is similar to the echo return signal; and then subtracting or suppressing the echo return signal. The residual echo signal 104 will be further suppressed through a post-processing block 105 which could be Echo Suppressor or Non-Linear Processor (NLP).

FIG. 2 shows an example of LEC system 209. Typically the echo signal 211 returns from the telephone hybrid 210. This echo return signal 211 needs to be cancelled or suppressed by LEC system 209. LEC usually works in a similar way as AEC. One of the major differences between them is that the echo path is different. The echo delay range could be also different. The residual echo signal 203 needs to be further suppressed through a post-processing block 204 which could be Echo Suppressor or Non-Linear Processor (NLP).

FIG. 3 shows a double talker's case that the residual echo signal is mixed with the non echo speech signal. 302 shows the spectral envelop of the mixed signal. 301 assumes the spectral envelop of the speech signal without echo signal. In most cases, residual echo formant 303 is much smaller than speech formant 304. It is much more difficult to suppress the residual echo in double talker area when it is mixed into speech signal than just the residual echo signal alone. This is because we want to suppress the residual echo signal without distorting the speech signal.

FIG. 4 explains an example case with 3 signals: Rx signal (reference signal) 401, Tx signal 402 before going to (residual) Echo Suppressor and Tx signal 406 as the output of (residual) Echo Suppressor. As shown in the figure, a successful (residual) Echo Suppressor could clean up both residual echo signal 404 and background noise 405 if it runs properly.

This invention proposed an Echo Suppression approach which can achieve robust performance with low complexity level. It works by gain-controlled filtering processing which can be defined by using the following filtering model:

$$F(z) = G_n(NSR) \cdot G_r(RSR) \cdot \frac{A_1(z)}{A_2(z)} \quad (1)$$

where $G_n(\ )$ is a gain which is a function of NSR (or SNR); NSR is defined as background Noise level to Signal level Ratio. NSR is measured by analyzing the Tx signal before the echo suppressor and utilizing VAD (Voice Activity Detection) information. $G_r(\ )$ is a gain which is a function of RSR; RSR is defined as an estimate of Residual echo level to Signal level Ratio in the Tx signal; RSR estimation is more complicated as explained later. $A_1(z)$ and $A_2(z)$ are linear predictors consisting of LPC coefficients, which are converted from $LSF_1$ and $LSF_2$ where LSF means Line Spectral Frequencies. Both LPC coefficients and LSF are well-known parameters in speech processing domain, that are often used to represent spectral envelope. $LSF_1$ is obtained by first modification of $LSF_{Tx}$, wherein $LSF_{Tx}$ is calculated from doing LPC analysis on the Tx signal (input signal of the echo suppressor); $LSF_2$ is obtained from second modification of $LSF_{Tx}$. The LSF modifications are controlled by the parameters SNR, RSR, and another set of $LSF_{Rx}$ which is calculated from the LPC analysis on the Rx signal.

In the equation (1), the gains, which usually do not go down to zero but could be small enough in pure echo area so that pure echoes can not be heard, mainly contribute to non-double talk area to significantly reduce the energy of pure echo or noise. The gain factors could be also smaller than 1 in speech or double talk areas, which depend on the parameters of NSR and RSR. Because NSR and RSR are made changing smoothly or slowly, the gain factors are also changed smoothly in time to avoid any "choppiness".

The LPC filters $A_1(z)$ and $A_2(z)$ in the equation (1) mainly contribute to suppress the residual echo spectral formants (see FIG. 3) in double talk area or to reduce noise spectrum magnitude in low SNR speech area. Since the parameters of LPC filters $A_1(z)$ and $A_2(z)$ change smoothly and slowly, no "choppiness" is introduced and no obvious speech distortion would be heard.

The basic concept has been summarized in the above. The details will be explained later.

Estimate of NSR (or SNR), which is defined as background Noise level to current Tx Signal level Ratio. Well-known approach can be used to determine this parameter. The background noise means the recent average background noise level when only the background noise exists in Tx signal. The signal level means the current frame or subframe signal level of Tx signal. When only the background noise exists, the NSR value should be around 1 in direct ratio domain or around 0 in dB domain. In speech area, NSR value should be smaller than 1 in direct ratio domain.

Residual Echo Signal Detector, which is designed to detect the most residual echo signal areas where only residual echo signal and noise exist. This detector does not need to be accurate because it will be only used to estimate the average echo energy loss comparing to the Rx signal energy. After the delay between the Rx signal and the echo return signal is detected, both the Rx signal and the residual echo signal have been already made synchronized in echo canceller. When double talk does not exist, the energy loss of the residual echo signal should be very significant after the basic echo canceller, comparing to the original Rx signal energy. This information can be used to detect most residual echo signal.

Estimate of RSR, which is defined as the Residual echo level to the current Tx Signal level Ratio. The signal level still means the current frame or subframe Tx signal level. It is more complicated to evaluate the residual echo level. If there is no residual echo, the residual echo level is zero. First, an average residual echo energy loss is estimated in the areas where only residual echoes exist, which is defined as a Ratio of the Residual echo level to the corresponding Received signal level (the Rx signal level). The energy level can be in direct domain or in dB domain. Let's note the average ratio (or the running mean of the ratio) is $$RRR = \text{Average}\left\{\frac{\text{Residual Echo Energy Level}}{\text{Rx Signal Energy Level}}\right\} \quad (2)$$

So, the current residual echo energy level can be estimates as

Current Residial Echo Level=$(RRR)$(Current Rx Signal Level) \quad (3)

With the above formula, the current residual echo level can also be estimated during even double talk areas. Finally, RSR is calculated by $$RSR = \frac{\text{Current Residual Echo Level}}{\text{Current Tx Signal Level}} \quad (4)$$

According to the definition of (4), RSR is around the value of 1 in pure residual echo areas and it should be smaller than 1 in double talk areas.

Gain $G_n(NSR)$ could be linear function or non-linear function of the parameter NSR. An example of the linear function can be $$G_n(NSR) = 1 - NSR \quad (5)$$

where $C_n$ is a constant: $0 < C_n < 1$

Gain $G_r(RSR)$ could be linear function or non-linear function of the parameter RSR. An example of the linear function can be $$G_r(RSR) = 1 - C_r \cdot RSR \quad (6)$$

where $C_r$ is a constant: $0 < C_r < 1$

Estimate of LSF of Tx signal, $LSF_{Tx}(i)$, i=0, 1, ..., Order−1, is based on LPC-analyzing the Tx signal. Typical number of Order is around 10 for narrow band signal at the sampling rate of 8 kHz.

Estimate of LSF of noise signal, $LSF_{nois}(i)$, i=0, 1, ..., Order−1, is based on the average (or running mean) of $LSF_{Tx}(i)$ in background noise areas of the Tx signal.

Estimate of LSF of Rx signal, $LSF_{Rx}(i)$, i=0, 1, ..., Order−1, is based on LPC-analyzing the Rx signal.

Estimate of LSF of (residual) echo signal, $LSF_{echo}(i)$, i=0, 1, ..., Order−1, is more difficult especially in double talk areas where residual echo signal is mixed in speech signal. As an example, $LSF_{echo}(i)$ can be calculated by using prediction from $LSF_{Rx}(i)$. First, the prediction factors, P(i), are evaluated by taking the recent average ratio (or running mean ratio) between $LSF_{Rx}(i)$ and $LSF_{Tx}(i)$ in the pure residual echo areas:

$$P(i) = \text{Average}\left(\frac{LSF_{Tx}(i)}{LSF_{Rx}(i)}\right), \quad (7)$$
$$0, 1, \ldots, \text{Order} - 1$$

Then, the current $LSF_{echo}(i)$ of residual echo is estimated by $$LSF_{echo}(i) = P(i) \cdot LSF_{Rx}(i), i=0, 1, \ldots, \text{Order}-1 \quad (8)$$

where $LSF_{Rx}(i)$ is the current Linear Spectral Frequencies of the Rx signal.

LPC predictors $A_1(z)$ and $A_2(z)$ are respectively converted from two sets of LSF, noted as $LSF_1(i)$ and $LSF_2(i)$, i=0, 1, ..., Order−1. Both $LSF_1(i)$ and $LSF_2(i)$ are based on modifications of $LSF_{Tx}(i)$. The modifications are mainly influenced by $LSF_{echo}(i)$, $LSF_{nois}(i)$, NSR, and RSR. As an example of the modifications, $LSF_1(i)$ and $LSF_2(i)$ are constructed as following:

$$LSF_1(i) = \lambda_1 \cdot LSF_{Tx}(i) + \beta \cdot LSF_{echo}(i) + \alpha \cdot LSF_{nois}(i), i=0, 1, \ldots, \text{Order}-1 \quad (9)$$

$$LSF_2(i) = \lambda_2 \cdot [LSF_{Tx}(i) - \beta \cdot LSF_{echo}(i) - \alpha \cdot LSF_{nois}(i)], i=0, 1, \ldots, \text{Order}-1 \quad (10)$$

where $$\beta = C_\beta \cdot RSR, \quad (11)$$

$$\alpha = C_\alpha \cdot NSR, \quad (12)$$

$C_\alpha$ and $C_\beta$ are constants. Their values should be larger than zero and much smaller than 1. $\lambda_1$ and $\lambda_2$ are determined in the following way:

$$\lambda_1 = 1 - \beta - \alpha, \quad (13)$$

$$\lambda_2 = \frac{1}{\lambda_1}, \quad (14)$$

EC Filter Divergence Protection means a way to avoid the level of Tx signal after Echo Canceller and Echo Suppressor to be larger than the one before Echo Canceller (noted as Tx1 signal). The two gains $G_n$ and $G_r$ in the equation (1) are tuned in a simple way to make sure that the output energy of the Echo Suppressor is always smaller or equal to the level of the Tx1 signal.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A method for suppressing background noises and residual echoes in a transmission signal, the method comprising:
   receiving, by an echo suppressor, the transmission signal;
   suppressing, by the echo suppressor, residual echoes of the transmission signal; and
   outputting, by the echo suppressor, an echo-suppressed transmission signal;
wherein suppressing the residual echoes of the transmission signal comprises:
   determining a noise level to signal level ratio (NSR) and a residual echo level to signal level ratio (RSR) of the transmission signal;
   performing a linear predictive coding (LPC) analysis on the transmission signal to obtain a LPC predictor A(z) consisting of LPC coefficients;
   converting the LPC coefficients to a set of Line Spectral Frequencies ($LSF_{Tx}$);
   modifying the $LSF_{Tx}$ to obtain a first modification of the $LSF_{Tx}$ ($LSF_1$) and a second modification of the $LSF_{Tx}$ ($LSF_2$);
   converting the $LSF_1$ and $LSF_2$ to obtain a first linear predictor $A_1(z)$ and a second linear predictor $A_2(Z)$, respectively;
   processing the transmission signal using a gain-controlled filtering processing function to obtain the echo-suppressed transmission signal:

$$F(z) = G_n(NSR) \cdot G_r(RSR) \cdot \frac{A_1(z)}{A_2(z)}$$

wherein $G_n(NSR)$ is a gain controlled by the NSR; and $G_r(RSR)$ is a gain controlled by the RSR.

2. The method of claim 1, wherein the signal level in the NSR is a current frame or subframe signal energy level of the transmission signal, and the noise level in the NSR is a recent average background noise energy level of the transmission signal.

3. The method of claim 1, wherein the signal level in the RSR is a current frame or subframe signal energy level of the transmission signal, and the residual echo level in the RSR is a current residual echo energy level estimated according to the following equation:

(Current Residial Echo Level)=$RRR$·(Current $Rx$ Signal Level)

where (Current Rx Signal Level) is an energy level of a currently received signal, and RRR is a running mean average ratio defined by the following equation:

$$RRR = \text{Average}\left\{\frac{(\text{Residual Echo Energy Level})}{(Rx \text{ Signal Energy Level})}\right\}$$

in which (Residual Echo Energy Level) is a residual echo energy level in the transmission signal, estimated when only residual echoes exist, and (Rx Signal Energy Level) is an energy level of a corresponding received signal.

4. The method of claim 1, wherein the gain $G_n(NSR)$ is a function of the NSR, $G_n(NSR) = 1 - C_n \cdot NSR$ where $C_n$ is a constant: $0 < C_n < 1$.

5. The method of claim 1, wherein the gain $G_r(RSR)$ is a function of the RSR, $G_r(RSR) = 1 - C_r \cdot RSR$ where $C_n$ is a constant: $0 < C_r < 1$.

6. The method of claim 1, wherein the $LSF_1$ and $LSF_2$ are obtained according to the following equations:

$LSF_1(i) = \lambda_1 \cdot LSF_{Tx}(i) + \beta \cdot LSF_{echo}(i) + \alpha \cdot LSF_{nois}(i)$, $i = 0, 1, \ldots, \text{Order}-1$ and $LSF_2(i) = \lambda_2 \cdot [LSF_{Tx}(i) - \beta \cdot LSF_{echo}(i) - \alpha \cdot LSF_{nois}(i)]$, $i = 0, 1, \ldots, \text{Order}-1$ in which the $LSF_{echo}$ is a set of Line Spectral Frequencies of a residual echo component in the transmission signal; $LSF_{nois}$ is a set of smoothed or average (running mean) Line Spectral Frequencies of the background noise component in the transmission signal; and $\lambda_1, \lambda_2, \beta, \alpha$ are controlling coefficients.

7. The method of claim 6, wherein the $LSF_{echo}(i)$ are calculated by using a prediction from $LSF_{Rx}(i)$:

$LSF_{echo}(i) = P(i) \cdot LSF_{Rx}(i)$, $i = 0, 1, \ldots, \text{Order}-1$ where $LSF_{Rx}$ is a set of Line Spectral Frequencies of a currently received signal; P(i) are prediction factors evaluated and saved by taking an average ratio (running mean ratio) between the $LSF_{Rx}(i)$ and the $LSF_{Tx}(i)$ only in residual echo areas:

$$P(i) = \text{Average}\left\{\frac{LSF_{Tx}(i)}{LSF_{Rx}(i)}\right\}, i = 0, 1, \ldots, \text{Order}-1.$$

8. The method of claim 6, wherein the controlling coefficients $\lambda_1, \lambda_2, \beta, \alpha$ are determined by the following equations:

$\beta = C_\beta \cdot RSR$ $\alpha = C_\alpha \cdot NSR$ $\lambda_1 = 1 - \beta - \alpha$ $\lambda_2 = \frac{1}{\lambda_1}$ where $C_\alpha$ ($0 < C_\alpha < 1$), and $C_\beta$ ($0 < C_\beta < 1$) are constants.

9. A method for suppressing background noises and residual echoes in a transmission signal, the method comprising:
  receiving, by an echo suppressor, the transmission signal;
  suppressing, by the echo suppressor, residual echoes of the transmission signal; and
  outputting, by the echo suppressor, an echo-suppressed transmission signal;
  wherein suppressing the residual echoes of the transmission signal comprises:
    determining a noise level to signal level ratio (NSR) and a residual echo level to signal level ratio (RSR) of the transmission signal;
    multiplying the transmission signal by a gain $G_n(NSR)$ and a gain $G_r(RSR)$, wherein $G_n(NSR)$ is a function of the NSR; and $G_r(RSR)$ is a function of the RSR; the signal level in the RSR and the NSR is a current frame or subframe signal energy level of the transmission signal, and the residual echo level in the RSR is a current residual echo energy level estimated according to the following equation:

(Current Residial Echo Level)=$RRR$·(Current $Rx$ Signal Level)

where (Current Rx Signal Level) is an energy level of a currently received signal (Rx), and RRR is a running mean average ratio of $$RRR = \text{Average}\left\{\frac{(\text{Residual Echo Energy Level})}{(Rx \text{ Signal Energy Level})}\right\}$$

where (Residual Echo Energy Level) is a residual echo energy level in the transmission signal, estimated when only residual echoes exist, and (Rx Signal Energy Level) is an energy level of a corresponding received signal.

10. The method of claim 9, wherein the gain $G_n(NSR)$ is a function of the NSR, $G_n(NSR) = 1 - C_n \cdot NSR$ where $C_n$ is a constant: $0 < C_n < 1$.

11. The method of claim 9, wherein the gain $G_r(RSR)$ is a function of the RSR, $G_r(RSR) = 1 - C_r \cdot RSR$ where $C_r$ is a constant: $0 < C_r < 1$.

12. A method for suppressing background noise and residual echo in a transmission signal, the method comprising:
  receiving, by an echo suppressor, the transmission signal;
  suppressing, by the echo suppressor, residual echoes of the transmission signal; and
  outputting, by the echo suppressor, an echo-suppressed transmission signal;
  wherein suppressing the residual echoes of the transmission signal comprises:
    performing a linear predictive coding (LPC) analysis on the transmission signal to obtain a LPC predictor A(z) consisting of LPC coefficients;

converting the LPC coefficients to a set of Line Spectral Frequencies ($LSF_{Tx}$);
processing the transmission signal using a filtering processing function:

$$F(z) = \frac{A_1(z)}{A_2(z)}$$

wherein $A_1(z)$ and $A_2(z)$ are two linear predictors consisting of LPC coefficients, in which the LPC coefficients of the $A_1(z)$ are converted from a first set of Line Spectral Frequencies ($LSF_1$) obtained from a first modification of the $LSF_{Tx}$; and the LPC coefficients of the $A_2(z)$ are converted from a second set of Line Spectral Frequencies ($LSF_2$) obtained from a second modification of the $LSF_{Tx}$.

13. The method of claim 12, wherein the $LSF_1$ and the $LSF_2$ are obtained from the following equations:

$$LSF_1(i) = \lambda_1 \cdot LSF_{Tx}(i) + \beta \cdot LSF_{echo}(i) + \alpha \cdot LSF_{nois}(i), i=0, 1, \ldots, \text{Order}-1$$

and $$LSP_2(i) = \lambda_2 \cdot [LSF_{Tx}(i) - \beta \cdot LSF_{echo}(i) - \alpha \cdot LSF_{nois}(i)], i=0, 1, \ldots, \text{Order}-1$$

in which the $LSF_{Tx}$ is calculated by performing a LPC analysis on the current transmission signal; $LSF_{echo}$ is a set of Line Spectral Frequencies of a residual echo component in the transmission signal; $LSF_{nois}$ is a set of smoothed or average (running mean) Line Spectral Frequencies of a background noise component in the transmission signal; and $\lambda_1, \lambda_2, \beta, \alpha$ are controlling coefficients.

14. The method of claim 13, wherein the $LSF_{echo}(i)$ are calculated by using a prediction from $LSF_{Rx}(i)$:

$$LSF_{echo}(i) = P(i) \cdot LSF_{Rx}(i), i=0, 1, \ldots, \text{Order}-1$$

where $LSF_{Tx}$ is a set of Line Spectral Frequencies of a currently received signal; $P(i)$ are prediction factors evaluated and saved by taking an average ratio (running mean ratio) between $LSF_{Rx}(i)$ and $LSF_{Tx}(i)$ only in residual echo areas:

$$P(i) = \text{Average}\left(\frac{LSF_{Tx}(i)}{LSF_{Rx}(i)}\right), i = 0, 1, \ldots, \text{Order}-1.$$

15. The method of claim 13, wherein the controlling coefficients $\lambda_1, \lambda_2, \beta, \alpha$ are determined in the following way:

$$\beta = C_\beta \cdot RSR$$
$$\alpha = C_\alpha \cdot NSR$$
$$\lambda_1 = 1 - \beta - \alpha$$
$$\lambda_2 = \frac{1}{\lambda_1}$$

$C_\alpha(0 < C_\alpha < 1)$, and $C_\beta(0 < C_\beta < 1)$ are constants; NSR is a Noise level to Signal level Ratio; RSR is a Residual echo level to Signal level Ratio.

16. An echo suppressing unit in an echo canceling system, comprising:
a signal receiving end, configured to receive a transmission signal from an echo canceller of the echo canceling system;
an echo suppressor, configured to suppress residual echoes of the transmission signal; and
a signal transmitting end, configured to output an echo-suppressed transmission signal; wherein the echo suppressor is configured to suppress the residual echoes of the transmission signal by:
determining a noise level to signal level ratio (NSR) and a residual echo level to signal level ratio (RSR) of the transmission signal;
performing a linear predictive coding (LPC) analysis on the transmission signal to obtain a LPC predictor A(z) consisting of LPC coefficients;
converting the LPC coefficients to a set of Line Spectral Frequencies ($LSF_{Tx}$);
modifying the $LSF_{Tx}$ to obtain a first modification of the $LSF_{Tx}$ (LSF) and a second modification of the $LSF_{Tx}$ (LSF);
converting the $LSF_1$ and $LSF_2$ to obtain a first linear predictor $A_1(z)$ and a second linear predictor $A_2(z)$, respectively; and
processing the transmission signal using a gain-controlled filtering processing function to obtain the echo-suppressed transmission signal;
wherein the gain-controlled filtering processing function is:

$$F(z) = G_n(NSR) \cdot G_r(RSR) \cdot \frac{A_1(z)}{A_2(z)}$$

wherein $G_n(NSR)$ is a gain controlled by the NSR and $G_r(RSR)$ is a gain controlled by the RSR.

17. An echo suppressing unit in an echo canceling system, comprising:
a signal receiving end, configured to receive a transmission signal from an echo canceller of the echo canceling system;
an echo suppressor, configured to suppress residual echoes of the transmission signal; and
a signal transmitting end, configured to output an echo-suppressed transmission signal;
wherein the echo suppressor is configured to suppress the residual echoes of the transmission signal by:
determining a noise level to signal level ratio (NSR) and a residual echo level to signal level ratio (RSR) of the transmission signal;
multiplying the transmission signal by a gain $G_n(NSR)$ and a gain $G_r(RSR)$, wherein $G_n(NSR)$ is a function of the NSR; and $G_r(RSR)$ is a function of the RSR; the signal level in the RSR and the NSR is a current frame or subframe signal energy level of the transmission signal, and the residual echo level in the RSR is a current residual echo energy level estimated according to the following equation:

(Current Residual Echo Level)=$RRR \cdot$(Current Rx Signal Level)

where (Current Rx Signal Level) is an energy level of a currently received signal (Rx), and RRR is a running mean average ratio of $$RRR = \text{Average}\left\{\frac{(\text{Residual Echo Energy Level})}{(Rx \text{ Signal Energy Level})}\right\}$$

where (Residual Echo Energy Level) is a residual echo energy level in the transmission signal, estimated when only residual echoes exist, and (Rx Signal Energy Level) is an energy level of a corresponding received signal.

18. An echo suppressing unit in an echo canceling system, comprising:
- a signal receiving end, configured to receive a transmission signal from an echo canceller of the echo canceling system;
- an echo suppressor, configured to suppress residual echoes of the transmission signal; and
- a signal transmitting end, configured to output an echo-suppressed transmission signal; wherein the echo suppressor is configured to suppress the residual echoes of the transmission signal by:
- performing a linear predictive coding (LPC) analysis on the transmission signal to obtain a LPC predictor A(z) consisting of LPC coefficients;
- converting the LPC coefficients to a set of Line Spectral Frequencies ($LSF_{Tx}$);
- processing the transmission signal using a filtering processing function:

$$F(z) = \frac{A_1(z)}{A_2(z)}$$

wherein $A_1(z)$ and $A_2(z)$ are two linear predictors consisting of LPC coefficients, in which the LPC coefficients of the $A_1(z)$ are converted from a first set of Line Spectral Frequencies ($LSF_1$) obtained from a first modification of the $LSF_{Tx}$; and the LPC coefficients of the $A_2(z)$ are converted from a second set of Line Spectral Frequencies ($LSF_2$) obtained from a second modification of the $LSF_{Tx}$.

* * * * *